United States Patent Office 3,362,997
Patented Jan. 9, 1968

3,362,997
PHENOXY SUBSTITUTED ALKANALS
William A. Bolhofer, Frederick, Pa., assignor to Merck & Co., Inc., Rahway, N.J., a corporation of New Jersey
No Drawing. Filed June 16, 1964, Ser. No. 375,630
3 Claims. (Cl. 260—600)

This application is a continuation-in-part of my copending application Serial No. 369,000, filed May 20, 1964.

This invention relates to a new class of phenoxy substituted alkanal compounds which are useful in the treatment of hypercholesterolemia and to a novel method for their preparation. In addition to their use as pharmaceuticals the products of the invention are also valuable intermediates which react with esters of 2-haloalkanoic acids in the presence of zinc to produce phenoxy substituted 3-hydroxyalkanoic acids; which acids are also useful in the treatment of hypercholesterolemia by virtue of their ability to reduce the concentration of cholesterol in blood serum.

The phenoxy substituted alkanals of this invention are compounds having the following structural formula:

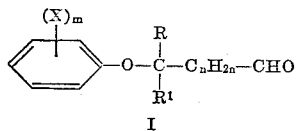

I wherein R and $R^1$ represent similar or dissimilar lower alkyl radicals, e.g., methyl, ethyl, propyl, etc.; X is a member selected from the group consisting of hydrogen, halogen, e.g., chlorine, bromine, fluorine, etc., lower alkyl, e.g., methyl, ethyl, etc., halo-lower alkyl, e.g., trihalomethyl such as trifluoromethyl, etc., cycloalkyl, e.g., mononuclear cycloalkyl containing 5–6 nuclear carbon atoms such as cyclopentyl, cyclohexyl, etc., lower alkoxy, e.g., methoxy, ethoxy, etc., lower alkylthio, e.g., methylthio, ethylthio, etc., aryl, e.g., phenyl, tolyl, xylyl, etc., aralkyl, e.g., benzyl, phenethyl, etc., aryloxy, e.g., phenoxy, etc., aralkoxy, e.g., benzyloxy, etc., alkenyl, e.g., lower alkenyl such as vinyl, allyl, etc., aralkenyl, e.g., styryl, etc., and, taken together, two X radicals on adjacent carbon atoms of the benzene ring may be combined to form an hydrocarbylene chain (i.e., a divalent organic radical composed solely of carbon and hydrogen) containing from three to four carbon atoms between their points of attachment, for example, 1,3-butadienylene (i.e., —CH=CH—CH=CH—)

etc.; m is an integer having a value of 1–3; and n is an integer having a value of 0–4.

A preferred embodiment of this invention is the class of phenoxy-alkanals represented by the following structural formula:

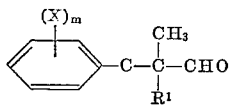

wherein X is halogen, $R^1$ is lower alkyl, preferably methyl; and m is an integer having a value of 1–3. The above class of compounds exhibits particularly good hypocholesterolemic activity and represents a preferred subgroup of compounds within the scope of this invention.

The alkanal products of the invention are prepared from their corresponding alkanol derivatives by treatment of the latter with a suitable oxidizing agent. Preferably, the reaction is conducted in the presence of a mixture of dicyclohexylcarbodiimide and anhydrous dimethyl sulfoxide but those skilled in the art will appreciate that any one of a wide variety of other oxidizing agents may also be employed in the process with similar results. Thus, chromium trioxide in sulfuric acid, chromium trioxide in pyridine and potassium dichromate in acetic acid are illustrative of the types of oxidizing agents which are suitable for converting primary alcohols to their aldehydes and which may be advantageously used in the instant process. In general, the process proceeds satisfactorily under ordinary reaction conditions and such limitations as high or low temperatures, pressures, etc. are not particularly critical aspects of the invention; however, stirring and slight warming as, for example, heating on the steam bath, facilitate the conversion of the alcohol reactants to the aldehydo products and are thus preferably employed in conducting the reaction. The following equation illustrates the process:

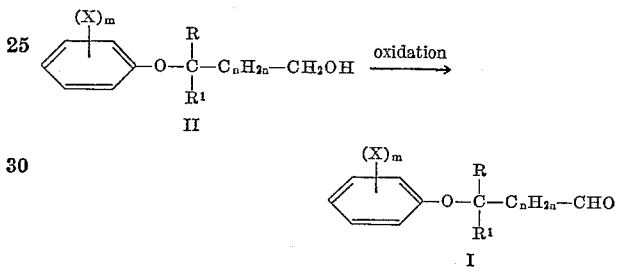

wherein the radicals R, $R^1$, X, m and n are as defined above.

The phenoxy substituted alkanols (II) employed as starting materials in the process are conveniently prepared by the reduction of an appropriately substituted phenoxy-alkanoic acid (III, infra) with an hydride reducing agent as, for example, with lithium aluminum hydride. The process proceeds most satisfactorily by the addition of an anhydrous ethereal solution of the phenoxy-alkanoic acid to an anhydrous ether solution of the hydride but, inasmuch as the addition of the acid to hydride usually results in an exothermic reaction, it is most desirable to add the acid slowly and at such a rate as to maintain the ether solution in a state of gentle reflux. Finally, the reaction mixture thus obtained is decomposed by the careful addition of water and dilute acid and the solvent phase containing the phenoxy-alkanol separated. Evaporation and distillation may then be employed to obtain the desired phenoxy-alkanol in pure form. The following equation illustrates the process:

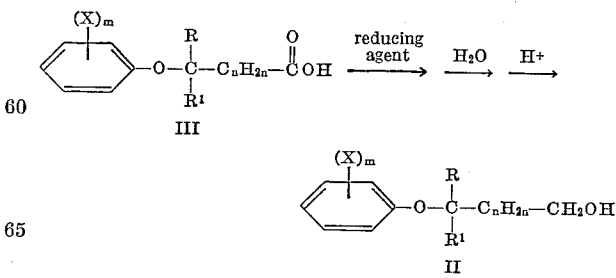

wherein the radicals R, $R^1$, X, $m$ and $n$ are as defined above and $H^+$ represents the cation derived from a suitable acid, e.g., a dilute aqueous hydrochloric acid solution. The amount of reducing agent used in the process varies with the type of phenoxy-alkanoic acid (III) employed but, when lithium aluminum hydride is the reagent of choice, it is usually most practical to employ up to two moles of hydride per mole of carboxylic acid reactant the phenoxy-alkanal starting materials (II) and the foregoing method of prepartion are described in applicant's copending application, Ser. No. 375,639, filed on even date.

Numerous studies support the concept that cholesterol plays a major role in the pathogenesis of atherosclerosis because along with lipids and fibrin it is the substance that accumulates in the intima and subintima and produces arterial corrosion. Therefore, a search for agents which will effect a reduction in serum cholesterol has long been an object of those skilled in the art and has led to the development of a wide variety of compounds having hypocholesterolemic activity. For this reason the phenoxy-alkanals of this invention were prepared and tested and found to compare most favorably with known hypocholesterolemic agents in protecting against induced hypercholesterolemia. Thus, 2 - (4 - chlorophenoxy) - 2 - methylpropionaldehyde has been found to effectively reduce the concentration of cholesterol in blood serum and ameliorates the condition associated with blood lipid deposition.

Furthermore, as indicated above, the phenoxy-alkanals of this invention are useful as chemical intermediates because they react with esters of 2-haloalkanoic acid in the presence of zinc to produce phenoxy substituted 3-hydroxyalkanoic acids. The following equation illustrates this process:

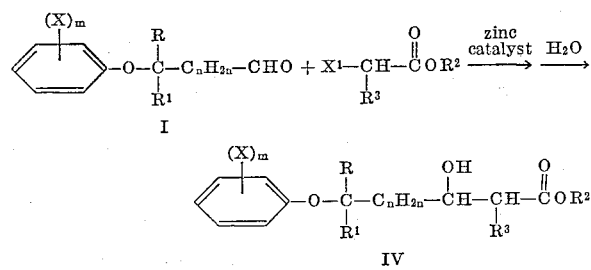

wherein $R^2$ is lower alkyl, e.g., methyl, ethyl, etc., $R^3$ is a member selected from the group consisting of hydrogen and lower alkyl, e.g., methyl, ethyl, etc.; $X^1$ is halogen, e.g., chlorine, bromine, etc., and the radicals R, $R^1$, X, $m$ and $n$ are as defined above. The phenoxy substituted 3-hydroxyalkanoate derivative (IV) thus formed may then be hydrolyzed to the desired carboxylic acid product by conventional means as, for example, by treating the said ester derivative with an aqueous solution of a base, e.g., an aqueous solution of sodium hydroxide. Preferably, the reaction is conducted with a solvent and at reflux temperatures because raised temperatures shorten the reaction time and the use of a solvent facilitates stirring and allows for a more effective control of the temperature. Suitable solvents which may be used in the reaction include, for example, benzene, ethyl ether, butyl ether, xylene and toluene or mixtures thereof as, for example, a mixture of benzene and ethyl ether or a mixture of benzene and toluene. The phenoxy substituted 3-hydroxyalkanoic acids thus produced are also useful in the treatment of hypercholesterolemia and are disclosed in my copending application, Ser. No. 369,000, filed May 20, 1964. The following examples illustrate the method of preparing the phenoxy substituted alkanals of the invention. However, the examples are illustrative only and are not to be construed as limiting the invention thereto. One skilled in the art will readily perceive that, by substituting the appropriate phenoxy substituted alkanol for the 2-(4-chlorophenoxy)-2-methyl-1-propanol employed in Example 1, all of the products falling within the scope of Formula I, supra, may be prepared.

*Example 1.—2-(4-chlorophenoxy)-2-methyl-propionaldehyde*

Step A: 2-(4-chlorophenoxy)-2-methyl-1-propanol.—A two-liter, three-neck, round-bottom flask fitted with a mechanical stirrer, a reflux condenser with a calcium chloride tube and a dropping funnel, is swept out with dry nitrogen gas and flame dried. Into this system is placed 4.5 g. (0.12 mole) of finely powdered lithium aluminum hydride and 400 ml. of anhydrous ethyl ether. 4-chlorophenoxy-isobutyric acid (15.0 g., 0.07 mole) dissolved in 100 ml. of anhydrous ethyl ether is placed in the dropping funnel and added dropwise to the stirred suspension of the lithium aluminum hydride. The reaction is exothermic and the acid solution is added at a rate sufficient to maintain gentle reflux of the solvent. The addition requires about one hour. When the addition is complete, the mixture is stirred, heated at reflux for one hour and excess lithium aluminum hydride is decomposed by the dropwise addition of anhydrous ethyl acetate until no further reaction occurs. Finally, the reaction mixture is decomposed by the cautious addition of 200 ml. of water. The water-ether mixture is stirred 15 minutes and then acidified with dilute hydrochloric acid. The layers are separated, and the ether phase is washed well with saturated sodium bicarbonate solution and water. After drying over anhydrous magnesium sulfate, the ether is evaporated on steam and the residue twice distilled in vacuo. There is thus obtained 12.5 g. (90%) of 2-(4-chlorophenoxy)-2-methyl-1-propanol as a colorless oil boiling at 100–101° C./0.5 mm. Hg; $n_D^{24}$ 1.5305.

Step B: 2 - (4 - chlorophenoxy) - 2 - methylpropionaldehyde.—2-(4-chlorophenoxy)-2-methyl-1-propanol (40.0 g., 0.20 mole) and dicyclohexylcarbodiimide (170 g., 0.80 mole) are dissolved in anhydrous dimethyl sulfoxide (800 ml.) in a three-neck, round-bottom flask fitted with a drying tube and mechanical stirrer. Stirring is begun and the mixture is warmed on a steam bath until a solution is obtained. Phosphoric acid (8.0 ml. of an 85% solution) is added and stirred and heating on the steam bath is continued for one hour. A white solid precipitates during this heating period. The heating is then terminated and the mixture stirred at room temperature for 16 hours. Finally, the mixture is heated on a steam bath for an additional hour. Then, while heating and stirring are continued, 50 ml. of water is added dropwise over one hour in order to decompose the excess carbodiimide. After cooling the solid is removed by filtration, washed thoroughly with 1500 ml. of water and the water washings are added to the dimethyl sulfoxide solution. The solid is then washed with one liter of ether. The combined filtrate from the reaction mixture and water washings are extracted with the ether washings and the resulting ether extracts are dried over anhydrous magnesium sulfate and then evaporated. The residue consists of a light yellow oil which is distilled in vacuo, yielding 32.5 g. (82%) of a water-white oil, B.P. 81–85° C./0.5 mm. Careful redistillation gives 31.5 g. (80%) of 2-(4-chlorophenoxy)-2-methyl-propionaldehyde, B.P. 82–83° C./0.5 mm.

By substituting the appropriate phenoxy substituted alkanoic acid reactant (III) for the 4-chlorophenoxy-isobutyric acid of Example 1, Step A, and following substantially the procedure described in Steps A and B of Example 1, all of the phenoxy substituted alkanals (I) of this invention may be prepared. The following equation illustrates the reaction of Step B of the foregoing example and accompanying Table I depicts the phenoxy substituted alkanol reactants (II) of the process and the corresponding phenoxy substituted alkanal products (I) produced thereby:

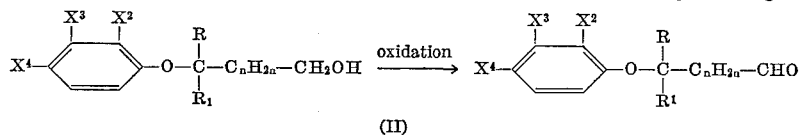

wherein $R^1$ is lower alkyl; X is halogen; and $m$ is an integer having a value of 1–3.

TABLE I

| Ex. | R | $R^1$ | $-C_nH_{2n}-$ | $X^2$ | $X^3$ | $X^4$ |
|---|---|---|---|---|---|---|
| 2 | $-CH_3$ | $-CH_3$ | | H | $-CF_3$ | H |
| 3 | $-CH_3$ | $-CH_3$ | | H | H | $-CH_3$ |
| 4 | $-CH_3$ | $-C_2H_5$ | | H | H | $-OCH_3$ |
| 5 | $-CH_3$ | $-CH_3$ | | $-\text{C}_6\text{H}_5$ | H | H |
| 6 | $-C_2H_5$ | $-CH_3$ | | $-CH_2-\text{C}_6\text{H}_5$ | H | H |
| 7 | $-C_3H_7$ | $-CH_3$ | | H | H | $-O-\text{C}_6\text{H}_5$ |
| 8 | $-CH_3$ | $-C_2H_5$ | $-CH_2-$ | $-O-CH_2-\text{C}_6\text{H}_5$ | H | H |
| 9 | $-C_2H_5$ | $-C_2H_5$ | | H | Cl | H |
| 10 | $-C_2H_5$ | $-CH_3$ | $-CH_2-CH_2-$ | $-CH=CH_2$ | H | H |
| 11 | $-CH_3$ | $-CH_3$ | | Cl | H | Cl |
| 12 | $-CH_3$ | $-CH_3$ | | H | $-CH_3$ | Cl |
| 13 | $-CH_3$ | $-C_2H_5$ | | H | H | Cl |
| 14 | $-C_3H_7$ | $-C_3H_7$ | | H | H | Cl |
| 15 | $-CH_3$ | $-CH_3$ | | H | H | $-O-CH_2-\text{C}_6\text{H}_5$ |
| 16 | $-CH_3$ | $-CH_3$ | | $-CH=CH-CH=CH-$ | | H |
| 17 | $-C_3H_7$ | $-CH_3$ | $-CH_2-$ | H | H | $-CH=CH-\text{C}_6\text{H}_5$ |
| 18 | $-CH_3$ | $-CH_3$ | | H | H | $-\text{C}_4\text{H}_3\text{S}$ (thienyl) |
| 19 | $-CH_3$ | $-C_3H_7$ | | $-SCH_3$ | H | H |
| 20 | $-CH_3$ | $-CH_3$ | | $-CH_3$ | H | $-CH_3$ |
| 21 | $-CH_3$ | $-CH_3$ | | $-OCH_3$ | H | $-CH_2-CH=CH_2$ |
| 22 | $-CH_3$ | $-CH_3$ | | $-OCH_3$ | H | $-CH=CH-CH_3$ |
| 23 | $-CH_3$ | $-CH_3$ | | H | $-CH_3$ | $-CH_3$ |
| 24 | $-CH_3$ | $-CH_3$ | | Cl | Cl | Cl |
| 25 | $-CH_3$ | $-CH_3$ | | H | H | $-CH=CH-\text{C}_6\text{H}_5$ |

It will be apparent from the foregoing description that the phenoxy substituted alkanals of this invention constitute a valuable class of compounds which have not been prepared heretofore. One skilled in the art will also appreciate that the processes disclosed in the above examples are merely illustrative and are capable of wide variation and modification without departing from the spirit of this invention.

What is claimed is:

1. A compound of the formula:

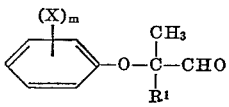

2. A compound of the formula:

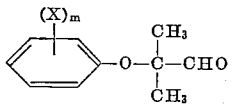

wherein X is halogen; and $m$ is an integer having a value of 1–3.

3. 2-(4-chlorophenoxy)-2-methylpropionaldehyde.

References Cited

UNITED STATES PATENTS 2,500,582   3/1950   Smith et al. _____ 260—600
2,918,497   12/1959  Walter _____ 260—600

OTHER REFERENCES

Gilman: Organic Chemistry, vol. 4 (1953) pages 1122, 1123.

BERNARD HELFIN, *Primary Examiner.*